United States Patent

Nishida et al.

[11] Patent Number: 5,860,610
[45] Date of Patent: Jan. 19, 1999

[54] MAGNETIC TAPE TENSION CONTROL DEVICE

[75] Inventors: Masafumi Nishida, Ibaraki; Osamu Yamaguchi, Katano; Souichirou Fujioka, Sakai; Hiroshi Okamoto, Nara; Yoshiho Gotoh, Osaka, all of Japan

[73] Assignee: Matsushita Electric Industrial Co., Ltd., Osaka, Japan

[21] Appl. No.: 607,764

[22] Filed: Feb. 27, 1996

Related U.S. Application Data

[62] Division of Ser. No. 375,223, Jan. 19, 1995, Pat. No. 5,540,398, which is a continuation of Ser. No. 917,347, Jul. 23, 1992, abandoned.

[30] Foreign Application Priority Data

Jul. 24, 1991 [JP] Japan .................................. 3-184475
Sep. 10, 1991 [JP] Japan .................................. 3-230148
Dec. 12, 1991 [JP] Japan .................................. 3-328566

[51] Int. Cl.$^6$ ........................... B65H 59/38; G11B 15/46; G11B 23/42

[52] U.S. Cl. ........................... 242/334.2; 242/334.3; 360/71

[58] Field of Search .............................. 242/334.2, 334.3, 242/334.5, 334.6; 360/71

[56] References Cited

U.S. PATENT DOCUMENTS

| 4,461,433 | 7/1984 | Kami | 242/412.3 |
| 5,039,027 | 8/1991 | Yanagihara | 242/334.2 |
| 5,222,684 | 6/1993 | Yoneda et al. | 242/334.2 |

*Primary Examiner*—John Q. Nguyen
*Attorney, Agent, or Firm*—Wenderoth, Lind & Ponack, L.L.P.

[57] ABSTRACT

A torque command supplied to a tape running unit for drawing out and driving a tape wound on a first reel is modulated by a torque modulator depending on a moment of inertia of the first reel, a winding radius of the tape wound on the first reel, a moment of inertia and a rotating radius of the tape running unit, which are detected by a parameter detector. The first motor is responsive to the modulated torque command for rotating the first reel, thereby keeping the tension of the tape constant.

2 Claims, 6 Drawing Sheets

MAGNETIC TAPE TENSION CONTROL DEVICE

This application is a Divisional application of application Ser. No. 08/375,223, filed Jan. 19, 1995, U.S. Pat. No. 5,540,398, which in turn is a Continuation of application Ser. No. 07/917,347, filed Jul. 23, 1992, abandoned.

BACKGROUND OF THE INVENTION

1. Field of the Invention

The present invention relates to a tension control device of magnetic tape in a tape running system of a video tape recorder (VTR) or the like.

2. Description of the Prior Art

In the case of an apparatus which draws out a magnetic tape (hereinafter referred to as tape) from a supply reel for recording and reproducing signals, such as in the VTR, it is required to keep constant the tension of the drawn-out tape in order to magnetically record and reproduce signals stably while maintaining a contact state between the tape constant and the magnetic head. Keeping the tape tension constant is also demanded from the viewpoint of decreasing tape damage.

In order to stabilize the tape tension, hitherto, it has been attempted to detect the tension of the drawn-out tape, feed it back, and control the torque of a first motor for directly driving the supply reel on which the tape is wound, thereby stabilizing the tension of the tape (for example, "Collection of Technical Papers of Modern VTR Design Technologies," edited by Japan Industrial Technology Center).

In such conventional constructions, there was a limit in enhancing the response of the feedback system including the first motor to cause the supply reel to follow up the motion of the takeup reel or the capstan responsible for speed control of the tape. In particular, if the response of the capstan or the takeup reel to a tape speed command is increased in order to improve the controllability, the tape becomes too tense or too loose.

SUMMARY OF THE INVENTION

It is hence a primary object of the present invention to present an excellent tension control apparatus free of overtension or tape sag even if the tape speed is changed quickly by sudden change of the torque of the motor for driving the capstan or takeup reel.

To achieve the above object, the present invention presents a tension control apparatus comprising: a first reel on which a tape is wound; a first motor for directly driving the first reel; tape running means for drawing out the tape from the first reel and running the tape at a specific speed; a second motor for directly driving the tape running means; a first driving circuit for generating a torque proportional to an input signal in the first motor; a second driving circuit for generating a torque proportional to a torque command given from outside in the second motor; a parameter detector for detecting a moment of inertia of the first reel about a rotary shaft of the first motor, a winding radius of the tape wound on the first reel, a moment of inertia of the tape running means about a rotary shaft of the second motor, and a rotating radius of the tape running means; and a torque modulator for modulating the torque command given from outside according to a detection output of the parameter detector, an output of the torque modulator being used as the input signal of the first driving circuit.

In the above-described construction, even if the tape speed is changed quickly by sudden change of the torque command of the second motor for driving the tape running means, the follow-up performance of the first reel is excellent, so that overtension or tape sag hardly occurs. Therefore, it is possible to have an apparatus which has superb controllability with a quick response to the tape speed command, and is practically very useful.

In addition to the above construction, the apparatus may further comprise tension detecting means for detecting a tension of the tape at a specific position on a tape running path from the first reel to the tape running means, and a first synthesizer for summing an output of the tension detecting means and the output of the torque modulator at a specific gain, an output of the first synthesizer being used as the input signal of the first driving circuit.

The thus composed apparatus has a damping property, which causes convergence of operation errors of the parameter detector and various disturbances, so that tension fluctuations can be further suppressed. Besides, the resonance due to mutual interference of the two reels, which are coupled through the tape, can be suppressed at the same time.

The tension detecting means and the first synthesizer may be replaced by a speed detector for detecting a rotating speed of the first motor, and a second synthesizer for summing up an output of the speed detector and the output of the torque modulator at a specific gain, an output of the second synthesizer being used as the input signal of the first driving circuit.

In order to improve stability of the control system, the detection signal of the tension detecting means must be differentiated when fed back to the motor. So, the tension control band, which should be widened, is restricted due to effects of noise components or the like. But, in the last mentioned constitution, since the stability of the control system is guaranteed by detecting the rotating speed of the first motor for directly driving the first reel and feeding it back to the motor, it is easier to broaden the control band of the tension control system. It is also possible to omit the tension detector.

DESCRIPTION OF THE PREFERRED EMBODIMENTS

Figure 1:
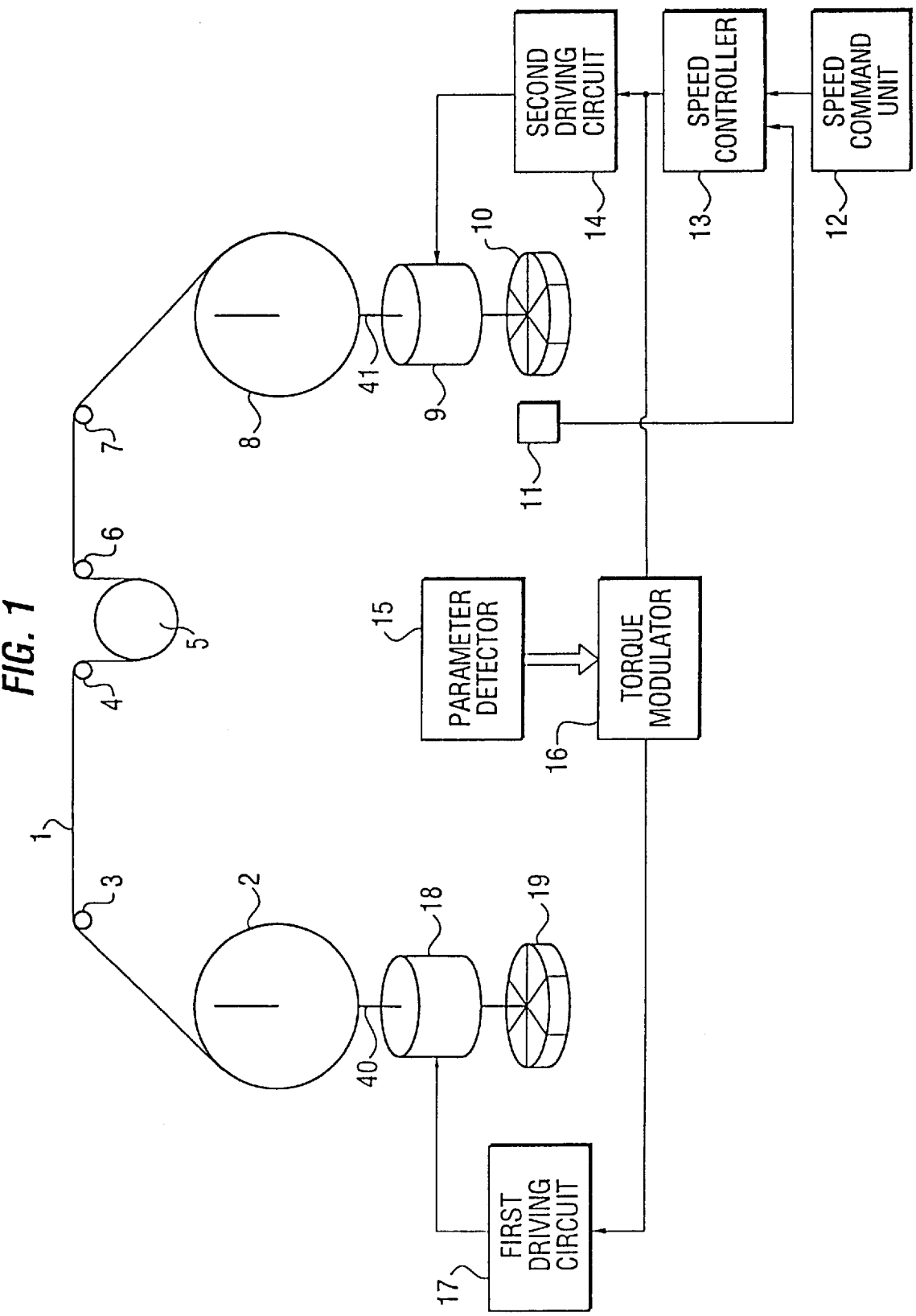
FIG. 1 is a structural diagram of a tension control apparatus in a first embodiment of the present invention.

Referring now to the drawings, some of the preferred embodiments of the tension control apparatus of the present invention are described in detail below. FIG. 1 is a structural diagram of a tension control apparatus in a first embodiment of the invention. This is an explanation about an embodiment of reel-to-reel mode in which the tape running means comprises the takeup reel and the tape is transferred by two reels. A tape 1 is drawn out of a supply reel 2, and is obliquely wound on a rotary drum 5 through posts 3, 4, and is taken up on a takeup reel 8 through posts 6, 7. A magnetic head is mounted on the rotary drum 5, and the tape 1 is recorded or reproduced by the known helical scan.

The tape speed is controlled by the takeup reel 8. The takeup reel 8 is directly coupled to a second motor 9 to be rotationally driven. A magnet 10, which is magnetized in multiple poles, is mounted on the rotary shaft of the second motor 9, and the magnet 10 rotates with the second motor 9, and a magnetic flux detecting element 11 confronting the magnet 10 generates a pulse at a frequency proportional to the rotating speed. A speed command unit 12 issues a rotating speed command value for the second motor 9 depending on the tape speed set from outside. A speed controller 13 detects the rotating speed of the second motor 9 from the output pulse of the magnetic flux detecting element 11, and varies the torque command of the second motor 9 so that the rotating speed command value of the speed command unit 12 and the rotating speed of the second motor 9 may coincide with each other. A second driving circuit 14 supplies electric power to the second motor 9 depending on the output of the speed controller 13. As a result, the tape speed is controlled by the speed command unit 12.

The tension of the tape 1 is controlled by the supply reel 2. In the present invention, in order to sufficiently suppress the tension fluctuations even in acceleration or deceleration of the tape, the same acceleration or deceleration as the acceleration or deceleration of the tape 1 by the takeup reel 8 is applied to the supply reel 2 side, so that the tension is kept constant. This arrangement is explained below. The parameter detector 15 detects the values of the radii rs, rt of the portions of the supply reel 2 and takeup reel 8 on which the tape is wound (hereinafter called winding radii), changing every moment as the tape runs, and the values of the moment of inertia Js of the supply reel 1 about the rotary shaft of the first motor 18 and the moment of inertia Jt of the takeup reel 8 about the rotary shaft of the second motor 9. The subscripts s, t denote the parameters of supply reel 2 and takeup reel 8, respectively. The torque modulator 16 calculates the torque necessary for the first motor 18 from the torque command of the second motor 9 produced by the speed controller 13, depending on the output of the parameter detector 15.

Supposing the tension of the tape 1 around the takeup reel 8 to be Ft and the back tension of the tape 1 near the supply reel 2 to be Fs, the relation is Ft=U·Fs, where U is the tension factor from the takeup reel 8 to the supply reel 2 determined by the mechanism. Supposing the moving speed of the tape 1 to be V, the torque of the second motor 9 to be Tt and the torque of the first motor 18 to be Ts, since the winding radius rt of the takeup reel 8 and the winding radius rs of the supply reel 2 vary smoothly, Tt and Ts are approximately expressed as in equations (1), (2) from the equation of motion of the reels 8, 2.

$$J_t \frac{\dot{V}}{r_t} = T_t - F_t \cdot r_t \quad (1)$$

$$J_s \frac{\dot{V}}{r_s} = T_s + F_s \cdot r_s \quad (2)$$

where the dot put on the character denotes the differential value with respect to the time.

From equations (1), (2), removing the differential of V, the torque Ts of the first motor 18 of the supply reel 2 for equalizing the acceleration or deceleration of the tape 1 transferred by two reels 2, 8 is expressed as in equation (3).

$$T_s = \frac{J_s \cdot r_t}{J_t \cdot r_s} (T_t - F_t \cdot r_t) - F_s \cdot r_s \quad (3)$$

Accordingly, the value of the tension factor U is properly determined depending on the mechanism, and Fs, Ft are selected at the tension target values of the supply reel 2 and takeup reel 8. In the torque modulator 16, using the detection value of the parameter detector, from the torque command of the second motor 9, the torque Ts of the first motor 18 is calculated by, for example, a microcomputer or the like according to equation (3), and is delivered to a first driving circuit 17. The first driving circuit 17 supplies electric power to the first motor 18 depending on the output of the torque modulator 16.

Thus, by calculating the torque necessary for the first motor 18 from the torque command of the second motor 9 and driving the first motor 18 by feed-forward operation, the supply reel 2 is put in action without time delay depending on the operation of the takeup reel 8. As a result, even in the case of sudden acceleration or deceleration of the tape speed, the tension fluctuations may be sufficiently suppressed.

Figure 2:
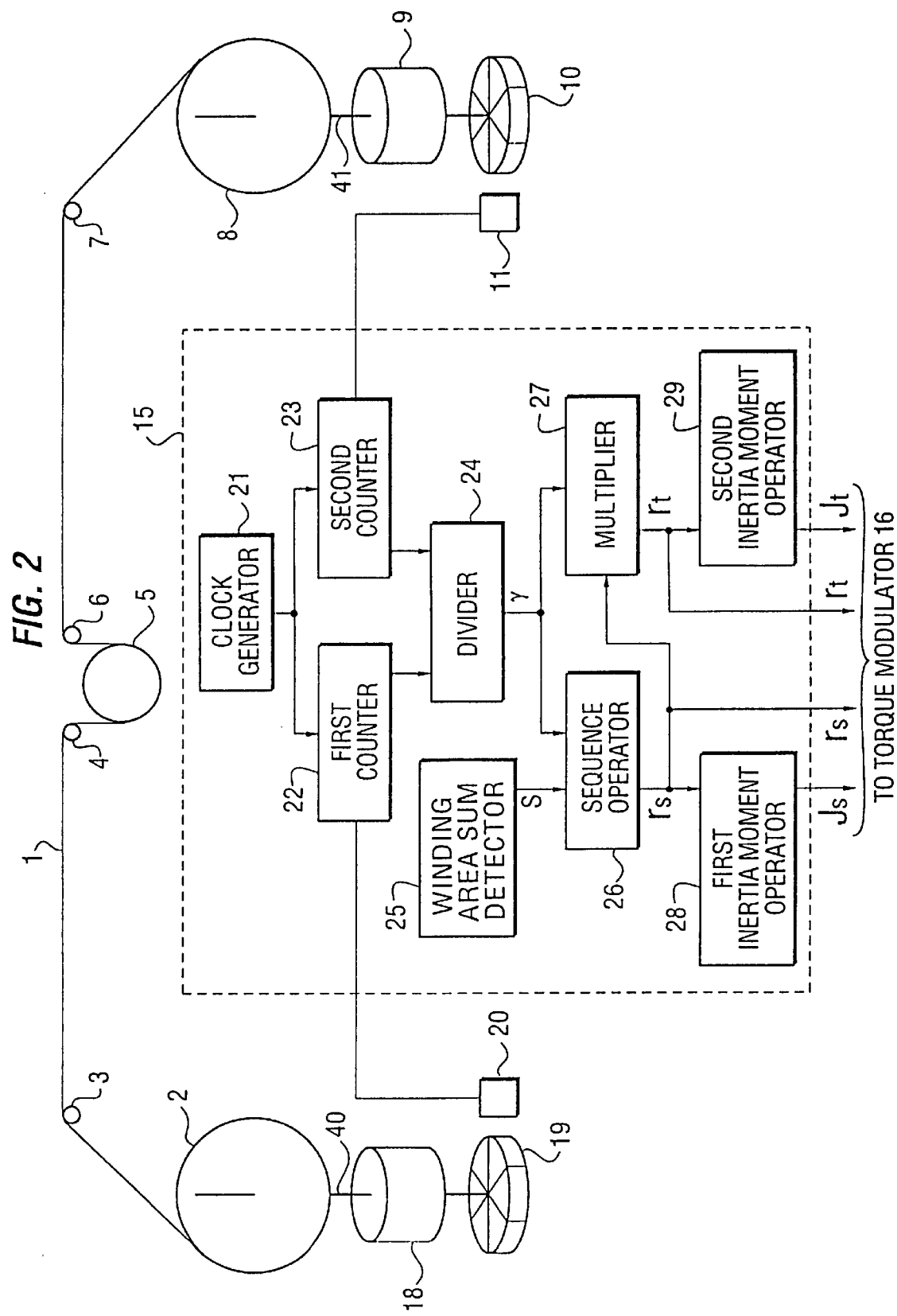
FIG. 2 is a structural diagram of a parameter detector in an embodiment in which a tape running means of the present invention is the takeup reel.

An embodiment of parameter detector 15 is explained by reference to FIG. 2. Magnets 10, 19 magnetized in multiple poles are mounted on rotary shafts of the first motor 9 and second motor 18. The magnets 10, 19 are magnetized in the same number of poles. The magnets 10, 19 rotate together with the rotations of the first motor 9 and second motor 18, and the magnetic flux detecting elements 11 and 20 confronting the magnets 10 and 19, respectively, generate pulses at the frequency proportional to the rotating speed of the first reel 2 and second reel 8. A clock generator 21 generates pulses in specific period Tc, and delivers to a first counter 22 and a second counter 23. The first counter 22 counts the number of pulses (Ns) entered from the magnetic flux detection element 20 in a specific period Tc. Likewise, the second counter 23 counts the number of pulses (Nt) entered from the magnetic flux detection element 11 within the specific period Tc. A divider 24 determines the ratio γ of the outputs of the first counter 22 and second counter 23.

$$\gamma = \frac{N_s}{N_t} \quad (4)$$

Since the takeup reel 8 and supply reel 2 are coupled together through the tape 1, the winding radius ratio rt/rs is given as the value of γ.

Below is described an embodiment of a winding area sum detector 25 for detecting the sum of the area of a circle of which radius is the winding radius of the tape 1 wound on the supply reel 2, and the area of a circle of which radius is the winding radius of the tape 1 wound on the takeup reel 8 (hereinafter called the winding area sum). The winding area sum is absolutely determined by the tape to be used, and is a fixed value not variable with the tape running. Accordingly, right after loading the tape 1, the tape 1 is run for a specific time by using the capstan and pinch roller, and the winding area sum is detected beforehand.

Pulse generators for generating pulses at the frequency proportional to the rotating speed are disposed on rotary shafts of the capstan, first motor 18 and second motor 9. The pulse generator is composed of, for example, a magnet magnetized in multiple poles mounted on a rotary shaft of a motor, and a magnetic flux detection element confronting the magnet. The number of pulses generated during one revolution of the capstan, takeup reel 8 and supply reel 2 is respectively supposed to be Zc, Z, Z, and the radius of the rotary shaft of the capstan is supposed to be rc. After running the tape 1 by using the capstan and pinch roller, the numbers of pulses of the capstan, takeup reel 8 and supply reel 2 generated within a specific period are supposed to be Nc0, Nt0, Ns0, respectively, the ratio of the numbers of the pulses of the capstan and takeup reel 8 to be Mt and the ratio of the numbers of the pulses of the capstan and supply reel 2 to be Ms, and seeing that they are coupled through the tape 1, it follows that $$M_t = \frac{N_{co}}{N_{to}} = \frac{r_{to} \cdot Z_c}{r_c \cdot Z} \quad (5)$$

$$M_s = \frac{N_{co}}{N_{so}} = \frac{r_{so} \cdot Z_c}{r_c \cdot Z} \quad (6)$$

where rt0, rs0 are the winding radius of the takeup reel 8 and winding radius of the supply reel 2 at each moment, and from equations (5), (6), we obtain $$r_{to} = \frac{Z}{Z_c} \cdot r_c \cdot M_t \quad (7)$$

$$r_{so} = \frac{Z}{Z_c} \cdot r_c \cdot M_s \quad (8)$$

Hence, supposing the winding area sum to be S, it may be expressed as in equation (9) by using the winding radii of the takeup reel 8 and supply reel 2 obtained in equations (7) and (8).

$$S = \pi(r_{to}^2 + r_{so}^2) \quad (9)$$

That is, right after loading the tape 1, the tape 1 is run for a specific time by the capstan and pinch roller, and when the pulse number ratio Mt of the capstan and takeup reel 8, and the pulse number ratio Ms of the capstan and supply reel 2 are determined, the winding area sum S is calculated according to equations (7), (8), (9). The winding area sum S is constant if the tape is the same, and it is not necessary to change as far as the tape is the same. If only one type of tape is used, S may be regarded as a constant.

From the winding radius ratio r delivered by the divider 24 and the winding area sum S delivered by the winding area sum detector 25, the winding radius of each of the supply reel 2 and takeup reel 8 may be determined by a sequence operator 26 and a multiplier 27. Since the winding radii of the supply reel 2 and takeup reel 8 are respectively rs, rt, the winding radius ratio r is obtained in equation (10).

$$\gamma = \frac{r_t}{r_s} \quad (10)$$

The winding area sum S obtained in the following equation by using the winding radii of the supply reel 2 and takeup reel 8.

$$S = \pi(r_t^2 + r_s^2) \quad (11)$$

From the relation of equations (10) and (11), the winding radii of the supply reel 2 and takeup reel 8 are obtained in equations (12), (13).

$$r_s = \sqrt{\frac{S/\pi}{1 + \gamma^2}} \quad (12)$$

$$r_t = \gamma \cdot r_s \quad (13)$$

However, as known from equation (12), it is necessary to calculate the square root. In the invention, accordingly, to calculate them, Newton-Raphson method known as the numerical calculation method is employed. To determine the square root of N (>0), the solution to the equation $$f(x) = x^2 - N = 0 \quad (14)$$

must be determined. By applying Newton-Raphson method in this calculation, assuming the initial value $x_0 = N$, it is possible to obtain the solution by the repetitive calculation of equation (14).

$$x_{i+1} = x_i - \frac{f(x_i)}{f'(x_i)} = \frac{x_i^2 + N}{2x_i} \quad (15)$$

That is, to calculate equation (12), $$x_0 = N = S/90/1 + \gamma^2 \quad (16)$$

is determined, and by calculating repeatedly by using equation (15), the winding radius of the supply reel 2 is obtained. This operation is guaranteed to be converged always on the solution, and the convergence is very prompt as compared with the generally known successive dividing method or linear inverse interpolation method, and the convergence is achieved in secondary step. In the actual apparatus, the CPU and others for performing these operations can be treated in a short processing time.

Accordingly, in the sequence operator 26, from the output γ of the divider 24 and the output S of the winding area sum detector 25, the initial value is determined by the calculation expressed in formula (16), the sequence obtained by the progressive formula expressed in equation (15) is calculated, and the value of the element $x_n$ obtained by repetitive calculation of the progressive formula by n times (n being a specific natural number) is delivered. In a multiplier 27, the output γ of the divider 24 and the value of the element $x_n$ delivered from the sequence operator 26 are multiplied. At this time, the outputs of the sequence operator 26 and multiplier 27 are the winding radii of the supply reel 2 and takeup reel 8 obtained by respective operations. Here, when a large value is selected for the specific natural number n, a sufficiently converged result is obtained, but a proper value should be selected in consideration of the operation time in the device and required precision in specification.

Furthermore, the winding radius rs of the supply reel 2 obtained in the sequence operator 26 is delivered to a first inertia moment operator 28, and the winding radius rt of the takeup reel 8 obtained in the multiplier 27 is produced to a second inertia moment operator 29, and by calculating equation (17), the moment of inertia J of the reels 1, 8 is obtained.

$$J = \frac{\pi \rho H (r^4 - r_h^4)}{2} + J_h + J_m \quad (17)$$

where Jh, Jm are moments of inertia of reel hub, and rotor of reel motor, and r is the winding radius of the reel detecting the values changing every moment. Besides, rh is the reel hub radius, $\rho$ is the specific gravity of the tape 1, and H is the width of the tape 1.

It is thus possible to detect the moment of inertia and winding radius of the supply reel 2 about the rotary shaft of the first motor 18, and moment of inertia and winding radius of the takeup reel 8 about the rotary shaft of the second motor 9. Depending on these values, from the torque command value of the second motor 9, the necessary torque of the first motor 18 may be calculated in the torque modulator 16.

In the present invention, therefore, the winding radii of the supply reel 2 and takeup reel 8 can be determined in a short time from the winding radius ratio and winding area sum of the supply reel 2 and takeup reel 8. Hence, the conventionally required memory for the conversion table for determining the winding radii of the two reels 2, 8 from the winding radius ratio is not needed. In particular, when using a tape changing largely in the winding radius, or when using multiple types of tapes differing in tape length, the conversion table is not needed, and the required memory does not increase. In the present invention, moreover, the torque of the first motor 18 is calculated according to the winding radius or moment of inertia, and feed-forward driving is effected. Accordingly, it is necessary to determine these parameters, such as the winding radius and moment of inertia, at high precision. In such a case, too, since the winding radius is determined by calculation,. it is easy to detect the winding radius and moment of inertia changing with the running of the tape at high precision and successively.

Figure 3:
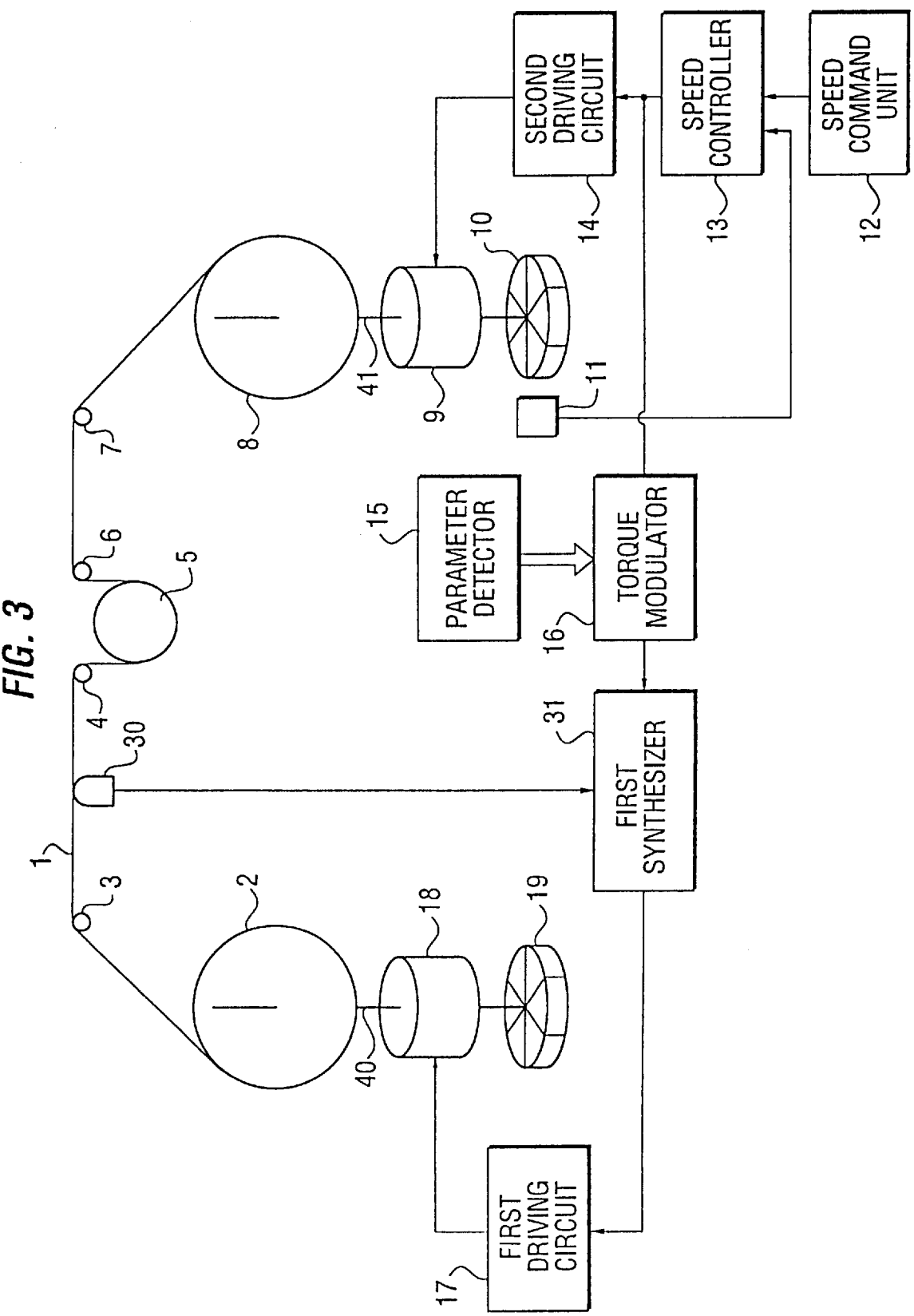
FIG. 3 is a structural diagram of a tension control apparatus in a second embodiment of the present invention.

In this construction, the tension of the tape 1 can be controlled. However, since the first motor 18 is driven by feed-forward in the construction, a slight tension variation may occur if a calculation error of torque of the first motor 18 obtained by calculation or some disturbances are present. Accordingly, a second embodiment is shown in FIG. 3. The same constituent elements as in the first embodiment are identified with same reference numbers.

The second embodiment features a pressure sensor 30 for detecting the tension of the tape 1 at a specific position of the running route of the tape 1 from the supply reel 2 to the takeup reel 8. The pressure sensor 30 is pressed with a force proportional to the tension of the tape 1, and an electric signal proportional to this pressing force is produced. That is, from the pressure sensor 30, an electric signal proportional to the tension of the tape 1 is obtained. A the first synthesizer 31 synthesizes the output of the pressure sensor 30 and the output of the torque modulator 16, and the output signal of the pressure sensor 30 is differentiated, and is combined with the output of the torque modulator 16. The first driving circuit 17 drives so that the torque proportional to the output of the first synthesizer 31 may be generated in the first motor 18.

Figure 4:
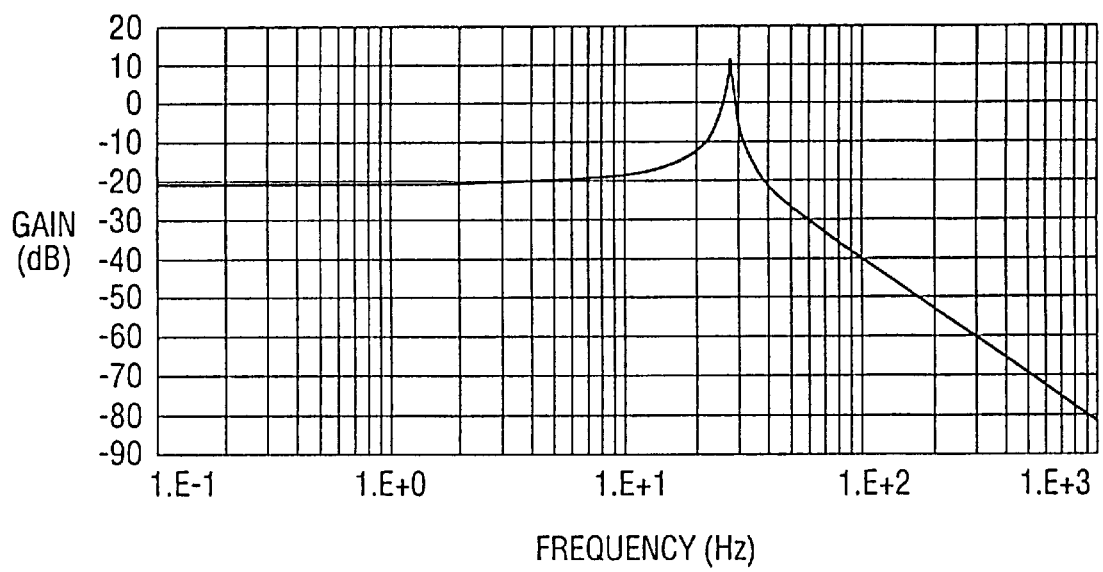
FIG. 4 is a disturbance suppression characteristic diagram of the tension control apparatus in the first embodiment of the present invention.
Figure 5:
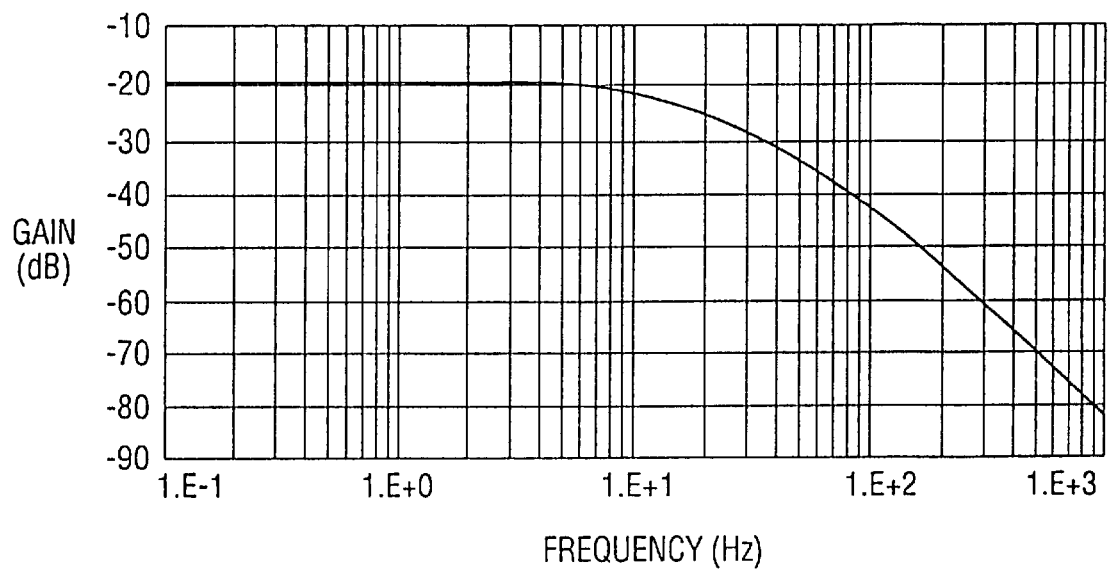
FIG. 5 is a disturbance suppression characteristic diagram of the tension control apparatus in the second embodiment of the present invention.

In such constitution, damping is effected in the system with the feedback system, and hence convergence is obtained against the errors of the feed-forward system and disturbances, and tension fluctuations can be suppressed. Furthermore, the resonance due to mutual interference of the two reels 2, 8 which are coupled via the tape 1 can be simultaneously suppressed. FIG. 4 shows an example of disturbance suppression characteristic which is a transmission characteristic from the torque disturbance of the supply reel to the tension in the first embodiment. FIG. 5 shows an example of disturbance suppression characteristic which is the transmission characteristic from the torque disturbance of the supply reel to the tension in the second embodiment.

Thus, the resonance existing in FIG. 4 can be suppressed by adding a feedback system using the pressure sensor 30, so that the stability can be enhanced. However, the resonance present in FIG. 4 is a mechanical resonance, and it is not so unstable as shown in the drawing actually, and the feedback system may not be required unless a tension control of high precision is required in the apparatus.

The output signal of the pressure sensor 30, the differentiated signal of the output signal of the pressure sensor 30, and the output of the torque modulator 16 are summed up at a determined gain, and the sum is delivered to the first driving circuit 17, so that the tension fluctuation may be further suppressed.

Figure 6:
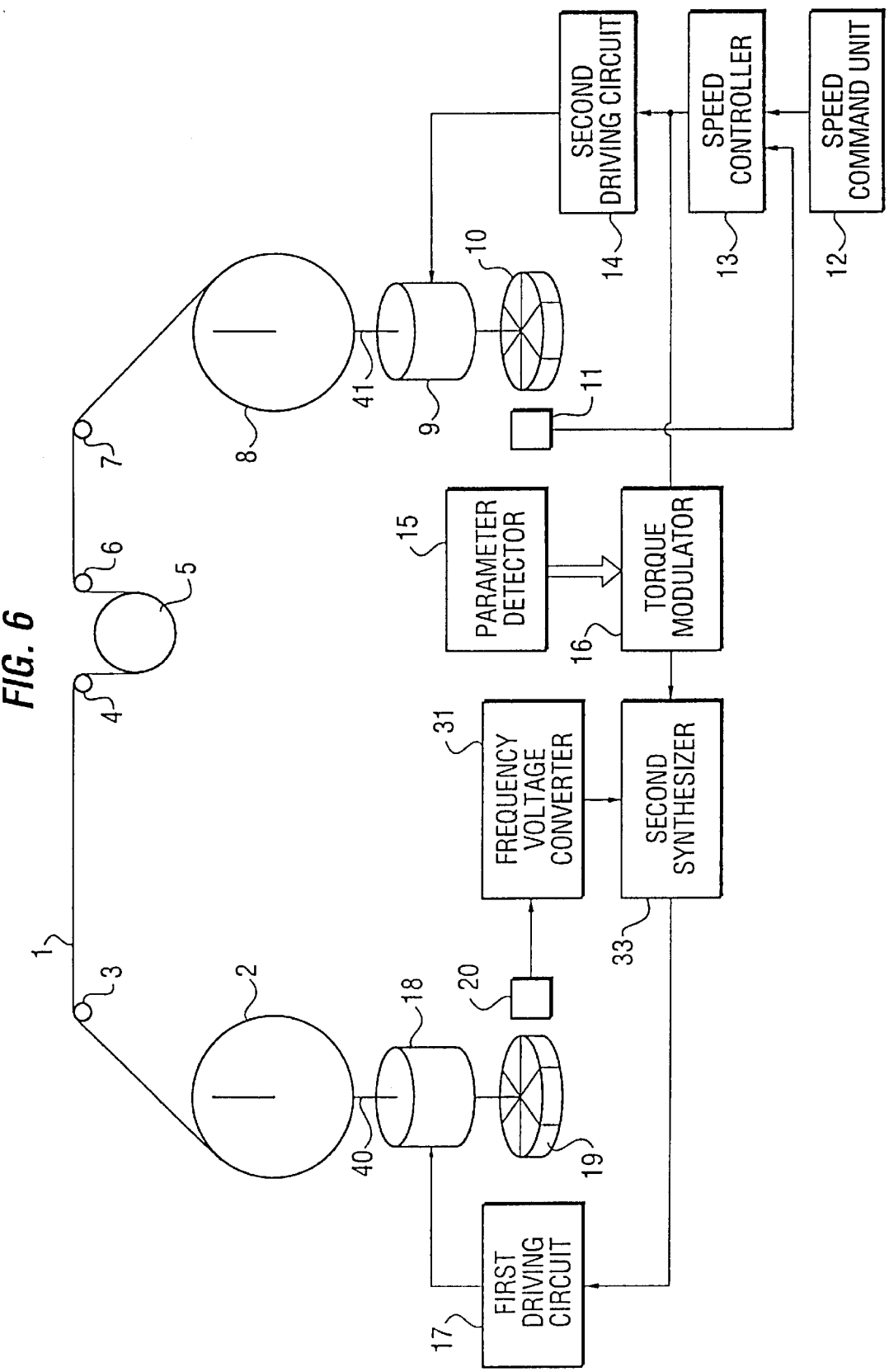
FIG. 6 is a structural diagram of a tension control apparatus in a third embodiment of the present invention.

A third embodiment is shown in FIG. 6. The constituent elements which are the same as in the first and second embodiments are identified with the same reference numbers. In the second embodiment, in order to guarantee stability of the control system, when feeding back the detection signal of the tension by the pressure sensor 30 to the first motor 18, its differential value was used. The feedback by adding the differential value of the feedback signal for stabilization of the control system is effective means not limited to such tension control device. However, considering an actual circuit system, it is difficult to realize stable differential processing in the high frequency region due to the noise component contained in the signal to be differentiated. Therefore, in case of broadening the band of the tension control system, it was a bottleneck and it was difficult to stabilize the tension control system sufficiently. The third embodiment of the present invention relates to improvement of this point, and is intended to propose a tension control device capable of composing a broader band tension control system without sacrificing the stability.

The third embodiment of the invention will be explained with reference to FIG. 6. On the rotary shaft of the first motor 18, a magnetic flux detecting element 20 is disposed opposite a magnet 19, which is magnetized on multiple poles, and a pulse at a frequency proportional to the rotating speed of the first motor 18 is generated. It is converted into a voltage signal proportional to the rotating speed of the supply reel 2 by a frequency voltage converter 32, and is fed into a second synthesizer 33. The second synthesizer 33 adds the change of the rotating speed of the supply reel 2 depending on the voltage signal of the frequency voltage converter 32 to the output of the torque modulator 16 at a gain determined in the direction of suppressing it, and determines the torque command value of the first driving circuit 17.

In such constitution, the control system has a damping effect and is enhanced in stability. In the second embodiment of the present invention, by differentiating the signal proportional to the tension, the control system is stabilized. But, as mentioned above, it was forced to have the restriction due to effects of the noise components contained when broadening the tension control band. In the tension control apparatus of the present invention, accordingly, without differentiating, the rotating speed of the first motor 18 for directly driving the supply reel 2 is detected and fed back, so that broadening of the band of the tension control system is easier. Furthermore, it is also possible to have a constitution without using the tension detector.

When the third embodiment is further combined with a pressure sensor 30 for detecting the tension as in the second embodiment, and by summing the output of the pressure sensor 30 and the output of the frequency voltage converter 32 and the output of the torque modulator 16 at a proper gain, tension control of high precision is possible. In this case, too, since the tension detection signal is not differentiated, when obtaining the tension control system in the same band as in the tension control apparatus in the second embodiment, the restrictions about the constitution of the tension detection mechanism can be largely alleviated.

Figure 7:
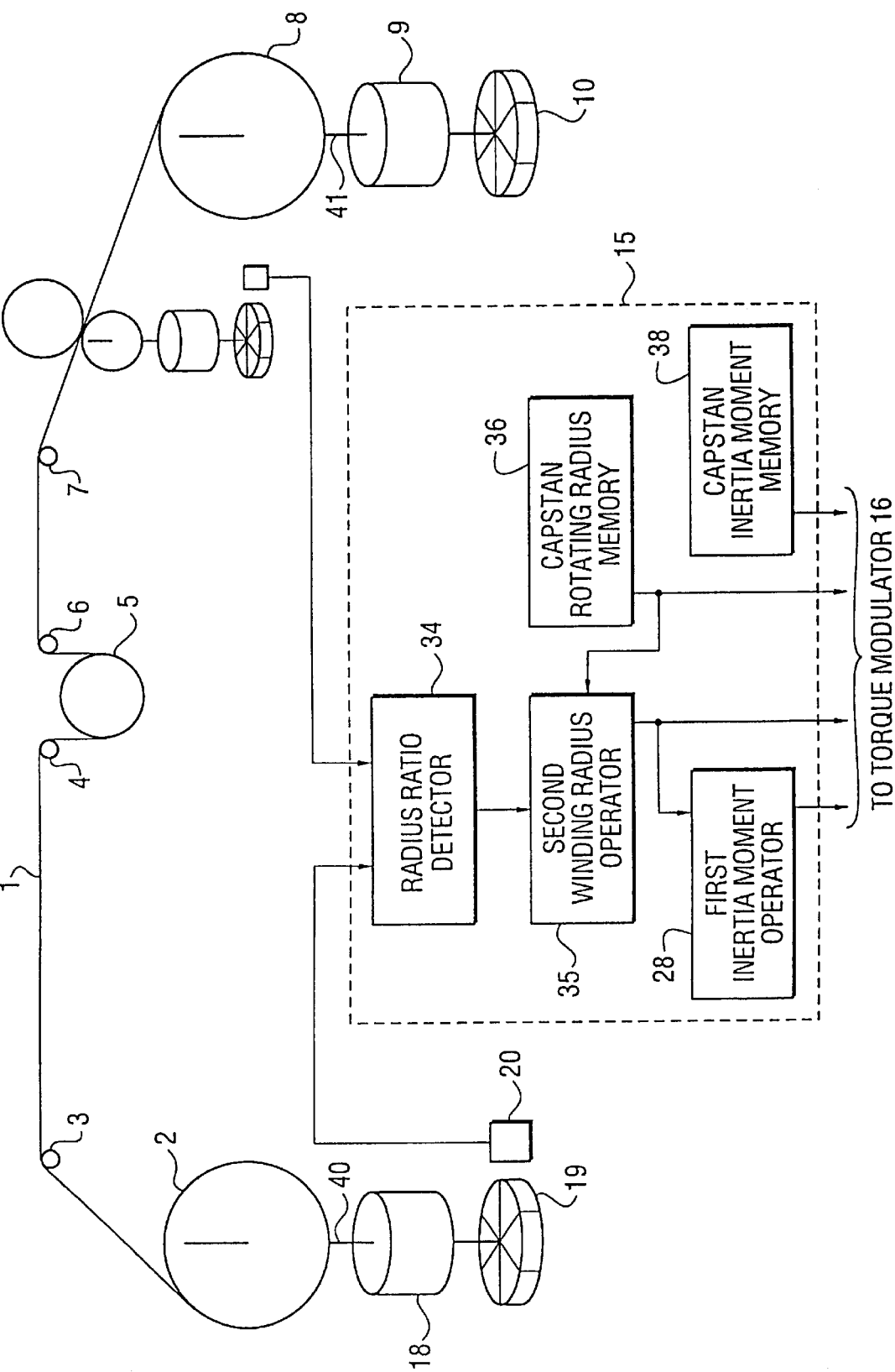
FIG. 7 is a structural diagram of a parameter detector in an embodiment in which the tape running means of the present invention is composed of capstan and pinch roller.

The first, second and third embodiments of the present invention relate to the use of the takeup reel 8 as the tape transfer means. When the capstan and pinch roller are used as the tape transfer means, the parameter detector 15 is composed as follows. FIG. 7 shows the constitution of an embodiment of the parameter detector 15 in which the capstan is used. The moment of inertia of the capstan and the radius of the rotary shaft of the capstan are fixed values, and they are measured preliminarily and stored in a capstan inertia moment memory 38, and a capstan rotating radius memory 36. Since the moment of inertia and winding radius of the supply reel 2 about the rotary shaft of the first motor 18 vary moment after moment, it is necessary to determine the values on the respective moments. As explained in relation to the winding area sum detector 24 in the first embodiment, a pulse generating circuit for generating the pulse at the frequency proportional to the rotating speed of the capstan and supply reel 2 is provided. It is supposed herein that pulses Zc, Z are generated during one revolution of the capstan and supply reel 2. As explained in the first embodiment, from the output pulses of two pulse generating circuits, the ratio Ms of the pulses of the capstan and supply reel 2 is detected by the radius ratio detector 34. The winding radius rs of the supply reel 2 is obtained, same as in equation (8), as follows:

$$r_s = \frac{Z}{Z_c} \cdot r_c \cdot M_t \tag{18}$$

That is, from the outputs of the radius ratio detector 34 and capstan rotating radius memory 36, the operation of equation (18) is performed in the second winding radius operator 35. The moment of inertia of the supply reel 2 is determined similarly in equation (17) in the first inertia moment operator 28 as shown in the first embodiment. Thus, the values of the first inertia moment operator 28, second winding radius operator 35, capstan inertia moment memory 38, and capstan rotating radius memory 36 are delivered to the torque modulator 16. The components, other than the parameter detector 15, may be composed in the same way as in the first, second and third embodiments.

In the above embodiments, a pressure sensor is used as the tension detector. But, a tension sensor which is composed of a moving post and a spring may be used to detect the tension of the tape. This tension sensor detects the tension by a position at which the force pressing the post is equal to the spring force.

What is claimed is:

1. A tension control apparatus comprising:
   a first reel on which a tape is wound;
   a first motor having a first rotary shaft coupled to said first reel for directly driving said first reel;
   a second reel for drawing out the tape from said first reel at a specific speed;
   a second motor having a second rotary shaft coupled to said second reel for directly driving said second reel;
   a first driving circuit connected to said first motor for generating in said first motor a torque, which is proportional to an input signal for said first driving circuit;
   a speed controller for generating a first torque command signal according to an input speed command;
   a second driving circuit coupled to said speed controller and said second motor for generating in said second motor a torque, which is proportional to the first torque command signal from said speed controller;
   a parameter detector for determining a moment of inertia of said first reel about said first rotary shaft of said first motor, a first winding radius of the tape wound on said first reel, a moment of inertia of said second reel about said second rotary shaft of said second motor, and a second winding radius of the tape wound on said second reel;
   a torque modulator coupled to said speed controller and said parameter detector for modulating the first torque command signal according to the moment of inertia of said first reel, the first winding radius, the moment of inertia of said second reel, and the second winding radius in order to obtain a second torque command signal;
   a tension detector for detecting tape tension at a specific position along a running path of the tape between said first reel and said second reel; and
   a synthesizer connected to said tension detector and said torque modulator for summing an output of said tension detector and the second torque command signal, wherein an output of said synthesizer is used as the input signal for said first driving circuit.

2. The tension control apparatus as claimed in claim 1, wherein said parameter detector comprises:
   a winding radius ratio detector for detecting a ratio of the first winding radius of the tape wound on said first reel to the second winding radius of the tape wound on said second reel;
   a winding area sum detector for detecting a sum of an area of a circle having a radius which is the first winding radius of the tape wound on said first reel and an area of a circle of which radius is the second winding radius of the tape wound on said second reel; and
   a first winding radius operator for determining the first winding radius of the tape wound on said first reel and the second winding radius of the tape wound on said second reel from an output of said winding area sum detector and an output of said winding radius ratio detector.

* * * * *